(12) United States Patent
Yang et al.

(10) Patent No.: US 9,497,411 B2
(45) Date of Patent: *Nov. 15, 2016

(54) ESTABLISHING A CONNECTION FOR A VIDEO CALL

(71) Applicant: APPLE INC., Cupertino, CA (US)

(72) Inventors: Yan Yang, San Jose, CA (US); Thomas Jansen, San Francisco, CA (US); Hyeonkuk Jeong, Saratoga, CA (US); Joe S. Abuan, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 14/537,519

(22) Filed: Nov. 10, 2014

(65) Prior Publication Data

US 2015/0281642 A1     Oct. 1, 2015

Related U.S. Application Data

(63) Continuation of application No. 14/231,171, filed on Mar. 31, 2014, now Pat. No. 8,917,311.

(51) Int. Cl.
*H04N 7/14* (2006.01)
*H04L 29/06* (2006.01)

(52) U.S. Cl.
CPC .......... *H04N 7/147* (2013.01); *H04L 65/1069* (2013.01); *H04N 7/148* (2013.01); *H04L 63/029* (2013.01); *H04L 69/28* (2013.01)

(58) Field of Classification Search
USPC ........................................... 348/14.01–14.07
See application file for complete search history.

(56) References Cited

U.S. PATENT DOCUMENTS

| | | | |
|---|---|---|---|
| 8,051,181 B2 | 11/2011 | Larson et al. | |
| 8,095,786 B1 | 1/2012 | Kshirsagar et al. | |
| 8,504,697 B2 | 8/2013 | Larson et al. | |
| 8,572,172 B2 * | 10/2013 | Abuan | H04L 29/125 709/203 |
| 2008/0034419 A1 | 2/2008 | Mullick et al. | |
| 2011/0252146 A1 * | 10/2011 | Santamaria | H04M 7/0057 709/227 |
| 2012/0140659 A1 * | 6/2012 | Furukawa | H04L 65/1069 370/252 |
| 2014/0122716 A1 | 5/2014 | Santhiveeran et al. | |

FOREIGN PATENT DOCUMENTS

WO     2014/062337     4/2014

* cited by examiner

*Primary Examiner* — Maria El-Zoobi
(74) *Attorney, Agent, or Firm* — Fay Kaplun & Marcin, LLP

(57) ABSTRACT

A system and method for conducting a video call between an originating device and a terminating device by establishing a peer-to-peer (P2P) connection between the devices. The originating and terminating devices exchange candidate information through a P2P server, except that the candidate information for the terminating device is altered before arriving at the originating device. The altering includes changing the IP address and corresponding port for each candidate. The originating device uses the altered candidate information to derive new candidate pairs that are sent to the terminating device, which uses the new candidate pairs to also derive a second candidate list. If the candidate pairs match, a P2P connection is established between the devices.

20 Claims, 8 Drawing Sheets

| Candidate | Candidate ID | Address:Port |
|---|---|---|
| A0 | 0xA0010000 | 10.0.1.3:12345 |
| A1 | 0xA0020000 | 1.2.3.4:10000 |

Fig. 7

| Candidate | Candidate ID | Address:Port |
|---|---|---|
| B0 | 0xB0010000 | 10.0.2.5:12344 |
| B1 | 0xB0020000 | 105.201.2.7:26653 |

Fig. 8

| Candidate Pair | Local | Remote |
|---|---|---|
| B0, A0 | 10.0.2.5:12344<br>0xB0010000 | 10.0.1.3:12345<br>0xA0010000 |
| B1, A1 | 105.201.2.7:26653<br>0xB0020000 | 1.2.3.4:10000<br>0xA0020000 |

Fig. 9

| Candidate | Candidate ID | Address:Port |
|---|---|---|
| B0' | 0xB0010000 | 0.0.0.0:0 |
| B1' | 0xB0020000 | 0.0.0.0:0 |

Fig. 10

| Candidate Pair | Local | Remote |
|---|---|---|
| A0, B0' | 10.0.1.3:12345<br>0xA0010000 | 0.0.0.0:0<br>0xB0010000 |
| A1, B1' | 1.2.3.4:10000<br>0xA0020000 | 0.0.0.0:0<br>0xB0020000 |

Fig. 11

| Candidate | Candidate ID | Address:Port |
|---|---|---|
| D-B1 | 0xB002A002 | 105.201.2.7:26653 |

Fig. 12

| Candidate Pair | Local | Remote |
|---|---|---|
| A1, D-B1 | 1.2.3.4:10000<br>0xA0020000 | 105.201.2.7:26653<br>0xB002A002 |

Fig. 13

| Candidate | Candidate ID | Address:Port |
|---|---|---|
| D-B1 | 0xB002A002 | 105.201.2.7:26653 |

Fig. 14

| Candidate Pair | Local | Remote |
|---|---|---|
| D-B1, A1 | 105.201.2.7:26653<br>0xB002A002 | 1.2.3.4:10000<br>0xA0020000 |

Fig. 15

ESTABLISHING A CONNECTION FOR A VIDEO CALL

BACKGROUND

Electronic devices (such as smartphones and laptops) are often used for performing video calls. In many instances, in order to perform a video call between devices, the devices must first establish a connection to support the video call. Despite the considerable effort spent in the art on techniques for establishing connections between devices for video calls, further improvements in this area would be desirable.

SUMMARY

This document describes, inter alia, a method for establishing a connection for a video call. The method including generating first candidate information related to an originating device and generating second candidate information related to a terminating device, each candidate of the first and second candidate information having a unique candidate identifier and includes a respective Internet Protocol (IP) address and corresponding port. The originating device sends a message to a videotelephony server including the first candidate information, which sends the message including the first candidate information to a push notification server, which sends the message to terminating device. The terminating device generates a first list of candidate pairs based on the first candidate information in the message and the second candidate information and sends a second message to the videotelephony server including the second candidate information. The videotelephony server adjust the second candidate information to create an adjusted second candidate information, wherein the adjusting includes altering the IP address and corresponding port for each candidate of the second candidate list maintaining the candidate identifier. The videotelephony server then sends a third message to the push notification server including the adjusted second candidate information, which sends the third message to the originating device including the adjusted second candidate information. The terminating device also sends a binding request to the originating device that includes the first list of candidate pairs. The originating device generates a second list of candidate pairs based on the first candidate information and the adjusted second candidate information and determines if the binding request is received within a predetermined amount of time after the third message.

When the binding request is received within the predetermined amount of time, the originating device determines if any of the candidate pairs from the first list match any of the candidate pairs from the second list. If there is no match between the candidate pairs from the first list and the second list, the originating device derives a new candidate related to the terminating device based on a source address and port information included in the binding request and generates a new candidate pair based on the new candidate and the first candidate information. The originating device sends a binding response including the new candidate pair and a derivation indication to the terminating device, which determines that the binding response includes the derivation indication and derives a second new candidate related to the terminating device based on a destination address and port information included in the binding response. The terminating device generates a second new candidate pair based on the second new candidate and the first candidate information. The originating device sends a second binding request to the terminating device including the new candidate pair.

The terminating device compares the second new candidate pair to the new candidate pair and when the second new candidate pair matches the new candidate pair, the terminating device sends a second binding response including the second new candidate pair and the new candidate pair. The originating device and the terminating device then establish a peer-to-peer (P2P) connection.

When the binding request is not received within the predetermined amount of time, the originating device sends a session setup message to a relay server, which forwards the session setup message to the terminating device. A relay connection is established between the originating device and the terminating device based on the session setup message. The originating device sends a second binding request to the relay server including the first candidate information, which forwards the second binding request to the terminating device. The terminating device sends a second binding response to the relay server including second candidate information, which is forwarded to the originating device. A videotelephony call is established between the originating device and the terminating device via a connection through the relay server. Then, a peer-to-peer (P2P) connection is established between the originating device and the terminating device based on the first and second candidate information allowing the connection through the relay server to be terminated and video call to be continued via the P2P connection.

This Summary is provided for purposes of summarizing some example embodiments to provide a basic understanding of aspects of the subject matter described herein. Accordingly, the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIG. 7 shows example candidates for a call-originating device.

FIG. 8 shows example candidates for a call-terminating device.

FIG. 9 shows example candidate pairs for a call-terminating device based upon the example candidates of FIGS. 7 and 8.

FIG. 10 shows example adjusted candidates for a call-terminating device.

FIG. 11 shows example candidate pairs for a call-originating device based upon the example candidates of FIG. 7 and the example adjusted candidates of FIG. 10.

FIG. 12 shows an example remote derived candidate for a call-originating device.

FIG. 13 shows an example candidate pair for a call-originating device based upon the example candidate of FIG. 7 and the example remote derived candidate of FIG. 12.

FIG. 14 shows an example local derived candidate for a call-terminating device.

FIG. 15 shows an example candidate pair for a call-terminating device based upon the example candidate of FIG. 7 and the example local derived candidate of FIG. 14.

DETAILED DESCRIPTION

Overview of Described Embodiments

Figure 1:
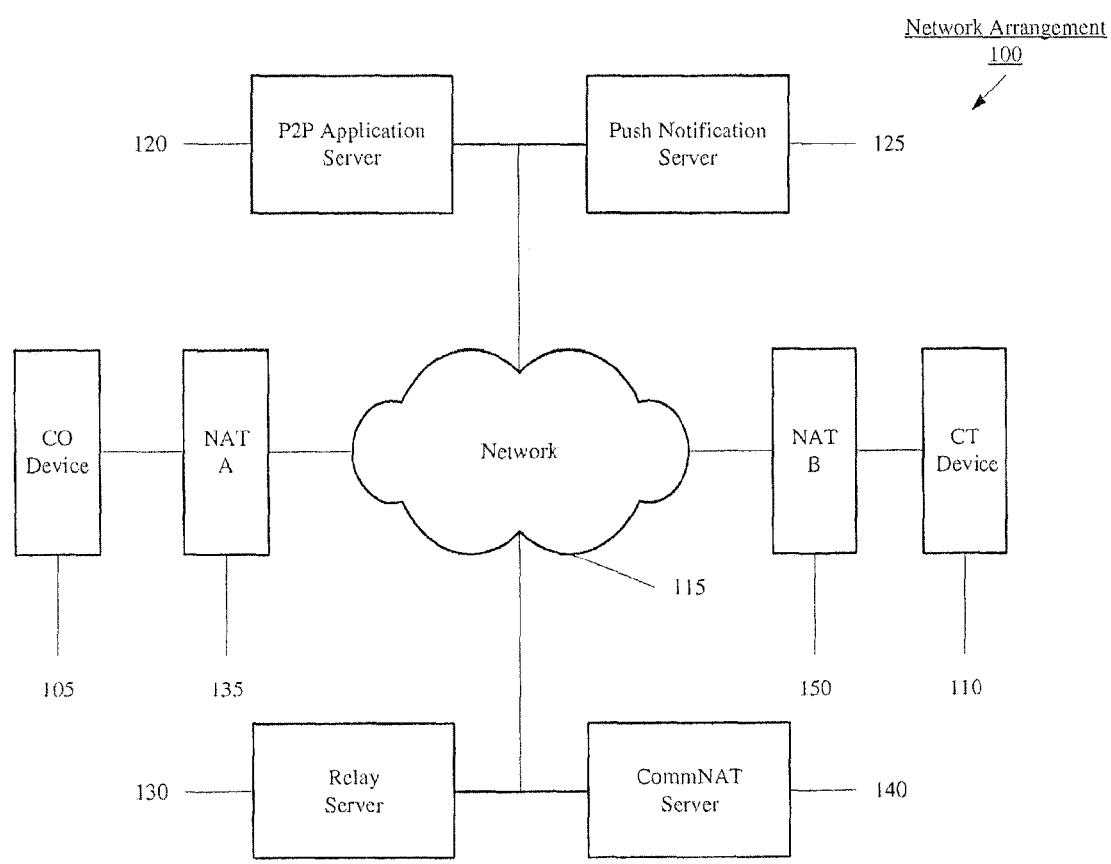
FIG. 1 shows an example network arrangement for devices to establish a connection for a video call.

The example embodiments may be understood with reference to the following description and the related appended drawings, wherein like elements are provided with the same reference numerals. The example embodiments are related to a system and method for establishing a connection for a video call. In the example embodiments described herein, the devices involved in a video call are described as a call-originating (CO) device (which initiates the video call) and a call-terminating (CT) device (the "receiving" endpoint of the video call that the CO device initiates). The terms "video call" and "videotelephony" as used in this description refer to a communication that includes a video portion (e.g., images of the call originator and/or the call receiver) and an audio portion (e.g., audio signals generated by the call originator and/or the call receiver). The video portion may be referred to as a "video stream" or "video component" and the audio portion may be referred to as an "audio stream" or "audio component." It should be understood that, in various embodiments, a video call may include (a) only a video component, (b) only an audio component, or (c) both a video component and an audio component.

In a first example connection manner, the P2P connection may be established using a derivation process. In a second example connection manner, the P2P connection may indirectly be established using a relay connection. The connection establishment, the devices, the derivation process, the P2P connection, the relay connection, related signaling diagrams, and related methods will be described in further detail below.

A video call may be established between the CO device and the CT device using a P2P connection. For example, the CO device may invite the CT device to the video call. As no connection has yet been established between the CO and CT devices, information may be exchanged therebetween to establish the P2P connection. For example, an intermediary P2P application server may initially be used. The procedure in which the P2P connection is to be established may relate to Session Initiation Protocol (SIP), which is a protocol used for controlling multimedia communication sessions such as voice and video calls over Internet Protocol (IP) networks.

As will be described in further detail below, some embodiments include a step where candidate IP address/port information that is communicated from the CT device is altered before it arrives at the CO device. As one example, the candidate information may be modified such that the IP address and port number in the candidate information are zeroed out. As will also be described in further detail below, the example embodiments provide mechanisms for operating in the context of different types of Network Address Translation (NAT) protocols. Specifically, when the NAT device that the CO device is behind implements a full cone NAT protocol (or is an "open" NAT device), the CO device may derive candidates for use in establishing the P2P connection. When the NAT device that the CO device is behind implements a port restricted NAT protocol or symmetric NAT protocol, the CO device may utilize a relay server to establish a relay connection. Subsequently, a check may be performed to teardown the relay connection and establish a P2P connection.

Figure 2:
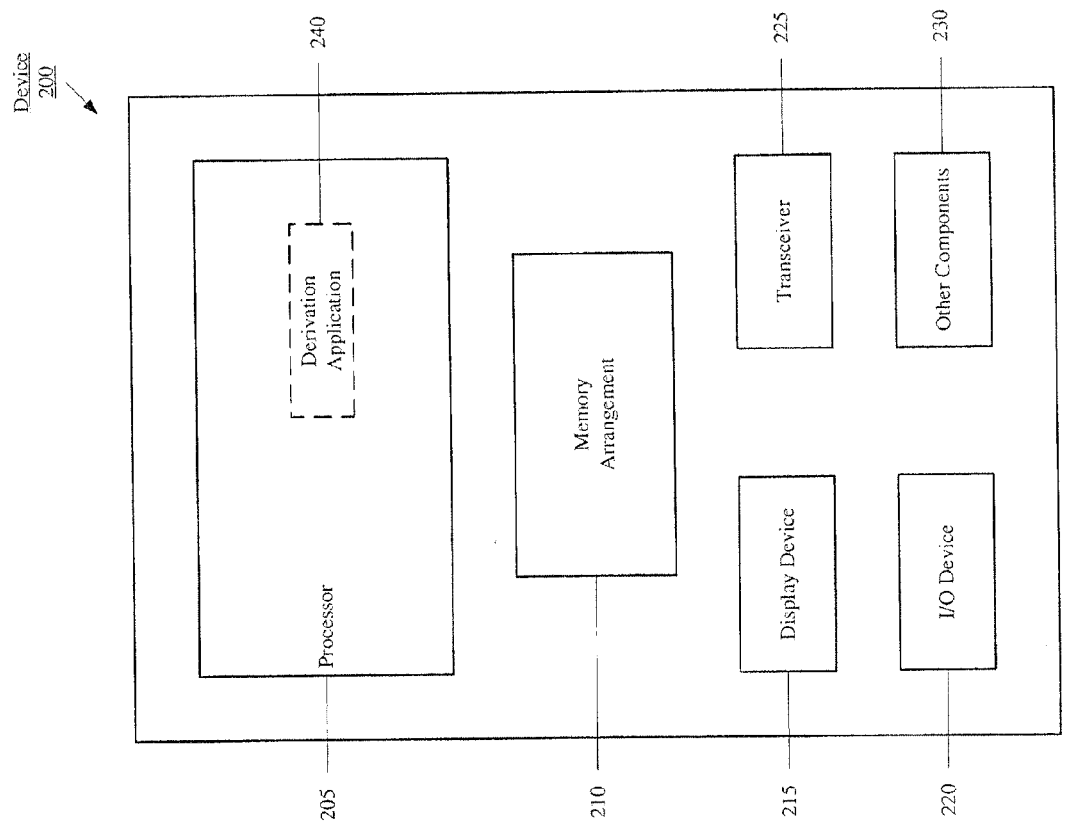
FIG. 2 shows an example device configured to establish a connection for the video call.
Figure 3:
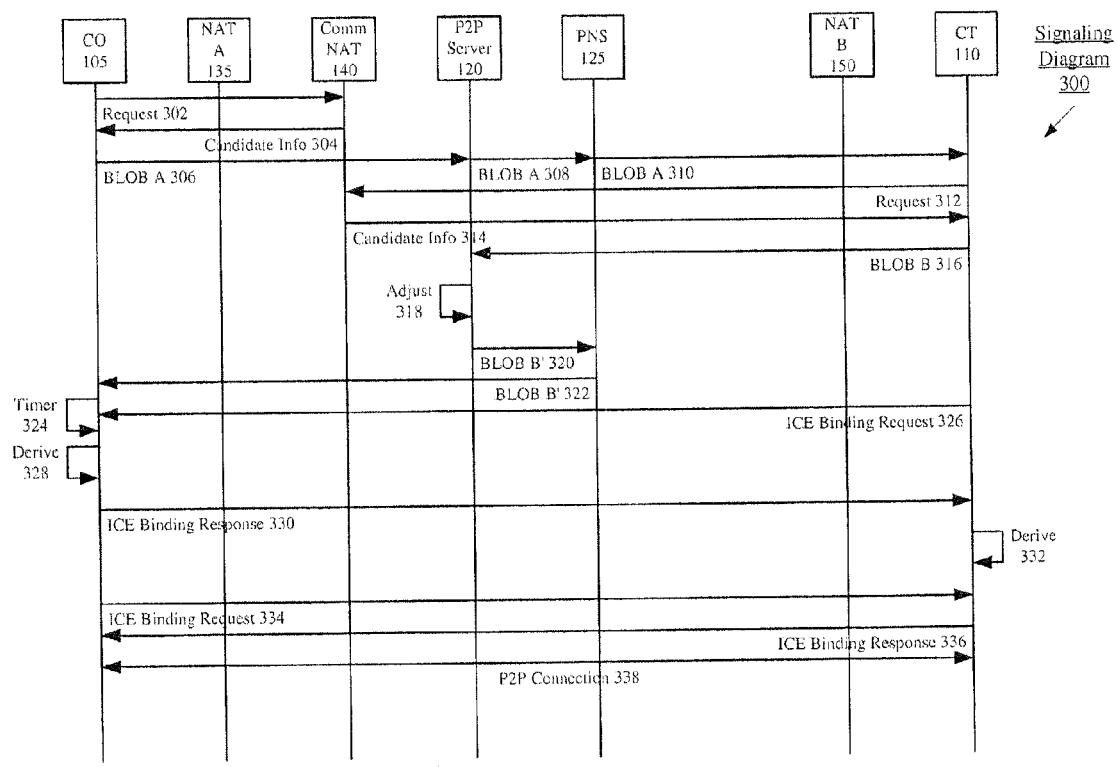
FIG. 3 shows a first example signaling diagram to establish a peer-to-peer connection for a video call.
Figure 4:
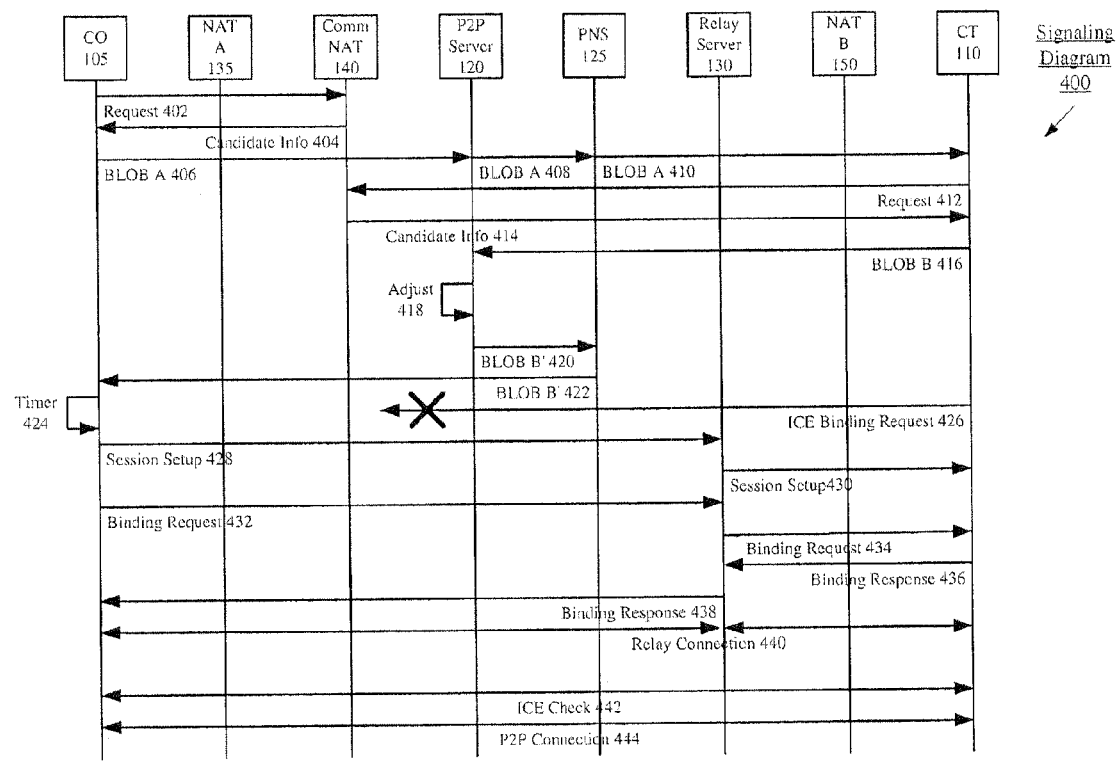
FIG. 4 shows a second example signaling diagram to establish a peer-to-peer connection for a video call by using a relay connection.
Figure 5:
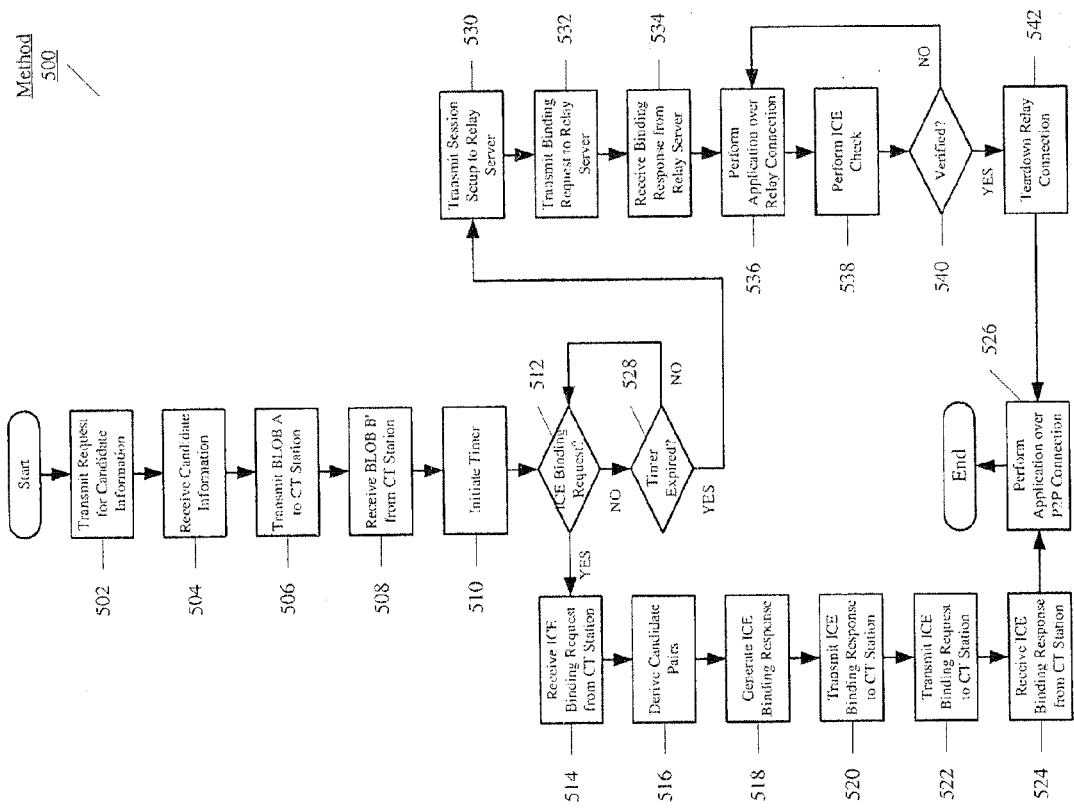
FIG. 5 shows a first example method for establishing a connection for a video call by a call-originating device.
Figure 6:
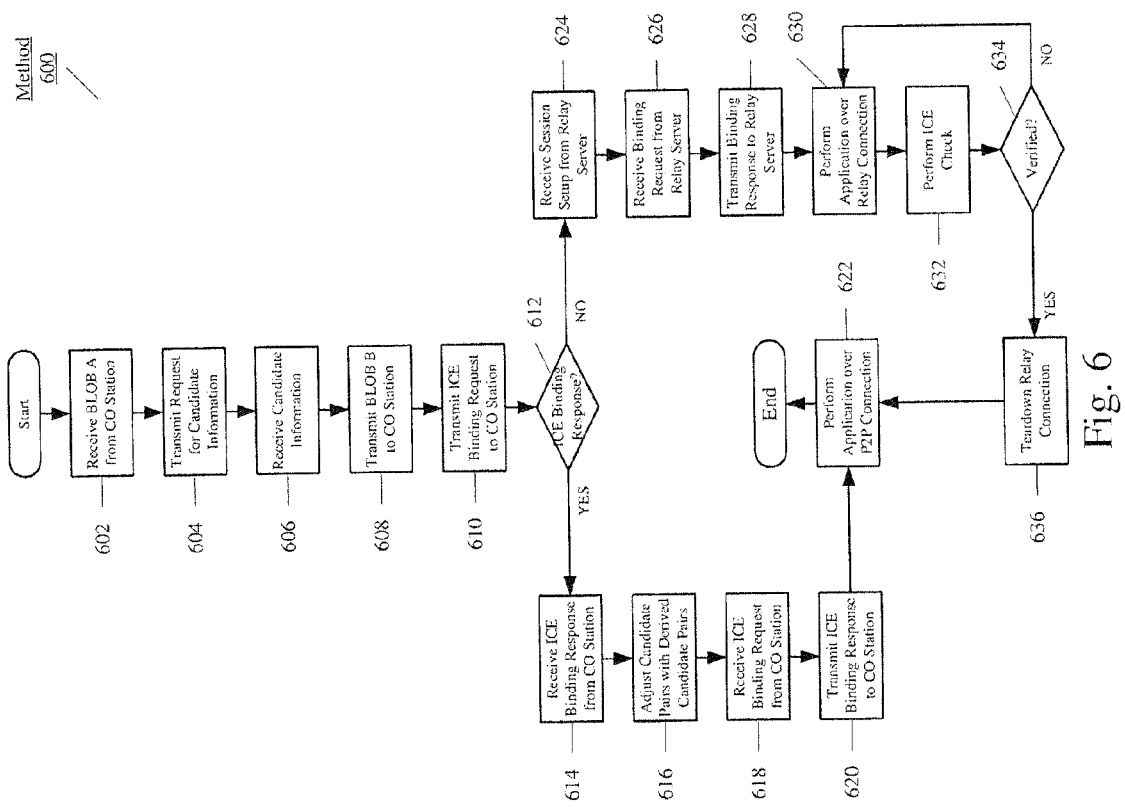
FIG. 6 shows a second example method for establishing a connection for a video call by a call-terminating device.

As will be described in further detail below, FIG. 1 shows an example network arrangement where the techniques for establishing video calls described herein may be implemented. FIG. 2 shows an example hardware configuration for implementing an electronic device capable of implementing the features described herein. FIG. 3 shows a first signaling diagram, where a video call is established between a CO device and a CT device. FIG. 4 shows a second signaling diagram, where a relay server is used to establish a video call between a CO device and CT device. FIG. 5 shows a flow chart diagram that corresponds to FIG. 3. FIG. 6 shows a flow chart diagram that corresponds to FIG. 4. FIGS. 7-15 show example candidate pairs that may be used with the techniques illustrated in FIGS. 3-6.

Network Address Translation (NAT)

Network Address Translation (NAT) is a protocol that allows multiple devices on a local IPv4 network to connect to a public network using a common public IPv4 address. The NAT protocol is commonly implemented in routers and other gateway devices at the boundary of a local network. On the local network, devices are given IP addresses from a range of "internal" or "private" IP addresses that are unique in the internal/private address space. When packets come in to the local network or travel out of the local network, the NAT device (the router/gateway device) modifies the IP address information in the packet headers. More specifically, when a packet is sent from "inside" the local network toward the "outside", the source IP address and port are translated from the internal/private address space on the local network into the address space on the outside. Similarly, packets from the outside to the inside have the destination address and port translated from the address space on the outside to the one on the inside. Typically, NAT rewrites the addresses by maintaining a table of bindings that map each internal IP address and port to an external IP address and port. A binding is created dynamically when the first packet from a particular internal IP address and port arrives at the NAT device.

There are a variety of different variations on NAT that have been defined, including full cone NAT, address restricted cone NAT, port restricted cone NAT (referred to herein as "port restricted NAT"), and symmetric NAT. When no NAT is used, this may be referred to as "open NAT."

Full cone NAT (also known as a one-to-one NAT) enables data to be coned into a reserved port (using mapping). Once an internal address and port (iAddr:iPort) are mapped to an external address and port (eAddr:ePort), packets from iAddr:iPort are sent through eAddr:ePort. Any external host can send packets to iAddr:iPort by sending packets to eAddr:ePort. Accordingly, full cone NAT provides a reserved port for the device.

Address restricted cone NAT enables data to be received when certain host-related conditions apply. Once an iAddr:iPort is mapped to an eAddr:ePort, packets from iAddr:iPort are sent through eAddr:ePort. An external host (hAddr:any) can send packets to iAddr:iPort by sending packets to eAddr:ePort only if iAddr:iPort has previously sent a packet to hAddr:any in which "any" refers to any port number.

Port restricted NAT enables data to be received into the local network when a packet has been transmitted out of the local network. Like the address restricted cone NAT, port restricted NAT relates to port numbers. Once an iAddr:iPort is mapped to an eAddr:ePort, packets from iAddr:iPort are sent through eAddr:ePort. An external host (hAddr:hPort) can send packets to iAddr:iPort by sending packets to eAddr:ePort only if iAddr:iPort has previously sent a packet to hAddr:hPort. That is, the mapping is created when the first packet is transmitted, thereby providing that no unsolicited ingress is performed.

Symmetric NAT enables data to be received in a controlled manner. Each request from the same internal IP address and port to a specific destination IP address and port is mapped to a unique external source IP address and port. If the same internal host sends a packet with the same source address and port but to a different destination, a different mapping is used. Only an external host that receives a packet from an internal host can send a packet back. That is, distinct mappings at the NAT device are used for different destinations, thereby providing that no unsolicited ingress is performed.

NAT may make it (in some instances) difficult for systems behind a NAT to accept incoming communications. Although the translation performed by NAT may not affect some protocols, other protocols (such as SIP) are affected. In particular, SIP is affected by the use of NAT since the SIP protocol establishes multimedia sessions between hosts by using IP addresses and ports included in payloads.

The Session Traversal Utilities for NAT (STUN), Traversal Using Relays Around NAT (TURN), and Interactive Connectivity Establishment (ICE) Protocols A number of protocols have been devised to address some of the issues surrounding the use of NAT, including the STUN, TURN, and ICE protocols.

Session Traversal Utilities for NAT (STUN) protocol is a client/server protocol that is used by a client to determine whether it is located behind a NAT device. Using the STUN protocol, a client communicates with a STUN server to obtain the client's public IP address (i.e., the address that it appears, to devices outside of the client's local network, that the client is using).

The Traversal Using Relays around NAT (TURN) protocol that may be used by a client that is behind a firewall (e.g. a NAT) to send and receive messages when the firewall would not normally allow P2P traffic. The TURN protocol uses a server to relay the messages between the two clients when one or both are behind a firewall.

The Interactive Connectivity Establishment (ICE) protocol is a form of P2P NAT traversal that works as an extension to SIP, and is built on STUN, TURN, and other techniques. When attempting to establish a P2P connection in which NATs are involved, the CO and CT devices may obtain information regarding their respective public IP addresses and ports using STUN. The plurality of addresses and ports allocated from local interfaces are both included in a SIP call-setup message from the CO device. Each address/port pair is referred to as a candidate and represents a potential point of communications for the agent. When the SIP call-setup request arrives, the CT device performs a substantially similar process such as including numerous addresses in the SIP response. The CO and CT devices may perform connectivity checks (which involve STUN messages sent from one device to the other), probing to find a particular pair of addresses that work or match. Once a pair is found, the probes cease and media may begin to flow as a P2P connection has been established between the CO and CT devices. As will be described in detail below, the detailed operation of the ICE protocol may be represented in six steps: gathering, prioritizing, encoding, offering and answering, checking, and completing. As will be used herein, the SIP call-setup request may be an ICE binding request when the ICE protocol is used. In a substantially similar manner, the SIP call-setup response may be an ICE binding response when the ICE protocol is used.

The first step used in the ICE protocol may be gathering. Prior to making a video call, the CO and CT devices begin gathering IP addresses and ports, each of which is a potential candidate for communications. The first candidate that is gathered is from interfaces on the host. If the host is multi-homed, the CO and CT devices gather a candidate from each interface. Candidates from interfaces on the host (including virtual interfaces) are referred to as host candidates. Subsequently, the CO and CT devices contact a STUN server from each host interface. The result is a set of server-reflexive candidates that are IP addresses that route to the outermost NAT between the device and the STUN server (e.g., on the public Internet). Finally, the CO and CT devices obtain relayed candidates from TURN servers. These IP addresses and ports reside on the relay servers. As an optimization, the TURN protocol allows a client to learn its relayed and server-reflexive candidates concurrently.

The second step used in the ICE protocol may be prioritizing. Once the CO and CT devices have gathered its candidates, it assigns each of them a priority value. Priorities range from 0 to $2^{31}-1$ (from the 32-bit representations) with larger numbers denoting a higher priority. The priorities are computed by means of a formula that combines preferences for types of candidates (where the types are host, relayed, and server reflexive) along with preferences for each host interface. The lowest priority may be given to the relayed candidates since sending media through a relay is expensive and increases voice latency. The use of a relay server will be discussed in further detail below. When a host is multi-homed, it typically prefers one interface to another for communications. For example, a Virtual Private Network (VPN) interface may be preferred to an Ethernet interface in order to keep intracompany voice communications on a private enterprise network.

The third step used in the ICE protocol may be encoding. With its candidates gathered and prioritized, the CO and CT devices construct its SIP invite request (i.e., ICE Binding Request) to set up the video call or, more specifically, establish the P2P connection. The body of the SIP request contains a Session Description Protocol (SDP) message (i.e., companion protocol to SIP) that conveys the information needed for transmitting the media content of the video call. This may include the types of media codecs, their parameters, and the IP addresses and ports to be used. The ICE protocol extends SDP by adding several new SDP attributes. The relevant addition for purposes of the example embodiments is the candidate attribute. For each media stream signaled in the SDP, there is a candidate attribute for each candidate the device has gathered. The attribute contains the IP address and port for that candidate as well as the priority and type of candidate (e.g., host, server reflexive, or relayed). The SDP may also contain credential information that is used to secure the STUN messaging, which commences at a later time.

The fourth step used in the ICE protocol may be offering and answering. Once the CO device has constructed its SIP invite request (i.e., ICE Binding Request) with the SDP payload, it sends the request to the CT device. The SIP network may deliver the request from the CO device to the CT device. Assuming the CT device also supports ICE, the CT device does not yet notify the user thereof (e.g., holds off on ringing the phone to indicate an incoming call). Instead, the CT device performs the same gathering, prioritizing, and encoding that the CO device has performed. The CT device then generates a provisional SIP response. Such a response indicates to the CO device that the request is being processed but that processing has not been completed. The provisional response also contains an SDP with the candidates that the CT device has gathered. The SIP network delivers the provisional response from the CT device to the CO device. It should be noted that the provisional SIP response is referred to as the ICE Binding Response herein.

The fifth step used in the ICE protocol may be checking. At this point, the CO and CT devices have exchanged SDP messages. Each is therefore aware of the set of candidates for each media stream that make up the video call. It should be noted that there may be more than one media stream such as an audio stream and a video stream in a video call. As the candidates have been gathered by both the CO and CT devices, they pair each of its candidates with a candidate from its peer to generate a list of candidate pairs. If each device provided three candidates for a media stream, there would be a total of nine candidate pairs for that media stream. Each device may compute a priority for the candidate pair by combining the priority of each individual candidate in the pair. For the ICE protocol, the objective is to determine a candidate pair for which media successfully flows in each direction. If many candidate pairs work, the objective is to select the highest-priority pair. Since the priority of each candidate (and consequently, the pair) is largest for those with fewest intermediate relays (whether they be a NAT or a TURN server), the highest-priority pair is also the one that provides the most direct path for media traffic.

To verify that a candidate pair works, the ICE protocol uses a STUN transaction from each device towards the other—this exchange is referred to as a "connectivity check." The STUN transaction uses the information included in the candidate pairs. The STUN transaction serves to verify bidirectional reachability for a candidate pair. Since the STUN transactions are sent on the same IP addresses and ports that are eventually used for media traffic, there is a need to demultiplex the STUN and media by using something besides the port. The headers of the STUN protocol allow it to be demultiplexed from arbitrary application traffic.

It should be noted that since the number of candidate pairs grows by the square of the number of candidates, the performing of the checks for each pair in parallel may be problematic. However, the ICE protocol performs the checks sequentially. The candidate pairs are ordered by priority, and every predetermined time period (e.g., 20 milliseconds), each device generates a STUN transaction for the next pair in the list. In addition, when a device receives a STUN request on a candidate pair, it immediately generates a STUN transaction in the reverse direction. Those skilled in the art will understand that this process is known as a triggered check and it improves the responsiveness of the ICE protocol.

The sixth step used in the ICE protocol may be completing. Once a check is completed, the CO and CT devices know a pair has been found that will work for media traffic. Since the checks are done in priority order, the first one to be completed will usually be the highest-priority pair that works. One of the devices (e.g., the CO device) generates a final check toward the other device (e.g., the CT device) confirming that the pair is the one selected. This may enable each device to unambiguously communicate which pair will ultimately be used for media.

Once this final transaction has been sent, the CT device may now indicate to the user that there is an incoming video call (e.g., ring the phone). All of the processing so far—the gathering and all of the connectivity checks—occurs prior to the CT device providing any indication that there is an incoming video call. Based on the above-described call setup procedure using the ICE protocol, there may be a delay in the call setup procedure because of the signaling that occurs prior to the actual call initiation. The more intervening devices, e.g., NATs, the longer the delay. However, the advantage of the above described process is that when the CT finally rings, the ICE protocol has ensured that the video and audio streams can successfully flow in both directions. In standard VoIP calls, it is common for the phone to ring, but the user does not hear anything when they answer the phone. This is referred to as a ghost ring. It has been determined that NAT and firewall traversal problems are the usual cause of ghost rings. However, because the ICE protocol ensures that the video and audio streams can flow in both directions prior to ringing the CT, the ICE protocol eliminates ghost rings.

Once the phone rings, the CT device answers. This generates a SIP 200 OK final response, confirming acceptance of the video call. When the CO device receives a 200 OK, it sends a SIP Acknowledgement (ACK). If the ICE protocol negotiation results in the selection of a candidate pair that differs from the default IP address and port carried in the SDP (the default is used for communicating with non-ICE endpoints), the CO device performs a SIP re-invite to update the default. This is done for the benefit of intermediate SIP elements that are not ICE aware but that need to know where media is being sent.

Therefore, using the above steps in the ICE protocol, a P2P connection may be established for a video call to be performed in which media (e.g., audio stream and video stream) flows bi-directionally. The ICE protocol also addresses when the CO and/or CT device is behind a NAT (or firewall). However, there may be instances where the CO and/or CT device is not aware of the IP address and channel that the other is using. That is, the candidate received from the other device may not be valid. Accordingly, the checking step may fail and the P2P connection may not be established. The example embodiments utilize the ICE protocol to establish a P2P connection but also provide a mechanism for the P2P connection to be established even when the checking step would otherwise fail.

Description of FIG. 1

FIG. 1 shows an example network arrangement 100 for a CO device 105 to perform a video call with a CT device 110 through a network 115. Specifically, the CO device 105 may establish a P2P connection with the CT device 110 to perform the video call. The CO device 105 may be behind a NAT A device 135, while the CT device 110 may be behind a NAT B device 150. In order to establish the P2P connection, the network arrangement 100 may include a P2P application server 120, a push notification server 125, a relay server 130 and a CommNat server 140. Specifically, the P2P application server 120 and the push notification server 125 may provide an initial communication pathway between the CO device 105 and the CT device 110 until the P2P connection is established. The relay server 130 may provide an intermediary communication pathway between the CO device 105 and the CT device 110 until a subsequent P2P connection is established.

The P2P application server 120 may be a network component that provides an initial connection between the CO device 105 and the CT device 110. For example, when the P2P application is a video call, the P2P application server 120 may be a videotelephony server. The CO device 105 and the CT device 110 may be registered with the videotelephony server. Thus, a user of the CO device 105 may select a user of the CT device 110 to perform a video call. The videotelephony server may provide the intermediary component for data to be transmitted therebetween to establish the P2P connection that is to be used during the video call. The push notification server 125 may be a network component that enables the data to be transmitted to its intended recipient. For example, when the video call is initiated, the videotelephony server may utilize a push notification service provided by a push notification server. The videotelephony server may indicate the data and the destination to the push notification server such that the CT device 110 ultimately receives the data.

The relay server 130 may also be a network component that is controlled by a third party. The P2P application server 120 and the push notification server 125 may provide the intermediary component that enables an initial communication between the CO device 105 and the CT device 110. However, once this initial communication is completed, the relay server 130 may provide a further intermediary component that enables a provisional communication pathway between the CO device 105 and the CT device 110. It should be noted that the use of the relay server 130 is only optional and is used when a particular scenario arises. Furthermore, when the relay server 130 is used, since a provisional communication pathway is generated, the use of the relay server 130 is only temporary. The CommNAT server 140 implements the Session Traversal Utilities for NAT (STUN) protocol (which was described in detail above), and may (in some embodiments) provide substantially similar functionality as a STUN server. In the example embodiments, the CommNAT server 140 is shown as a single server, however, those skilled in the art will understand that functionality described herein may be distributed to multiple server devices, e.g., a first CommNAT server may serve the NAT A device 135 and a second CommNAT server may serve the NAT B device 150.

The CO device 105 and the CT device 110 may represent any electronic device that performs the video call. It should be noted that the CO device 105 and the CT device 110 may be assumed to have the required hardware and software configuration to perform video call. For example, the hardware, the software, or both may be incorporated therein or may be coupled in a modular manner.

Description of Video Call Setup Procedure Using the Components of Network Arrangement 100

The CO device 105 which is behind a NAT A device 135 may transmit a request to the CommNAT server 140 to receive candidate information. As discussed above, an internal address (behind the NAT A device 135) may be used to generate an external address (outside the NAT A device 135). The internal address to external address may be mapped and stored. The candidate information may relate to both the internal and external addresses. For example and for explanatory purposes, the candidate information may include two candidates. A first candidate A0 may have a first candidate identifier (e.g., OxA0010000) and correspond to an internal address and port (e.g., 10.0.1.3:12345). A second candidate A1 may have a second candidate identifier (e.g., OxA0020000) and correspond to an external address and port (e.g., 1.2.3.4:10000). The candidate identifier may be, for example, a 4 byte code. FIG. 7 shows the example candidate information in table form including the candidate, the candidate ID, and the address:port information for the CO device 105. Once the candidate information has been received, the CO device 105 may generate a binary large object (BLOB) including the candidates (e.g., A0 and A1) to be transmitted to the CT device 110. Specifically, the BLOB from the CO device 105 (hereinafter "BLOB A") may be transmitted to the P2P application server 120. The P2P application 120 may determine the destination such that the BLOB A is forwarded to the push notification server 125 for transmission to the CT device 110.

When the CT device 110 receives the BLOB A, the CT device 110 may perform a substantially similar operation to generate its candidates. Specifically, the CT device 110, which is behind the NAT B device 150 may request the candidate information from the CommNAT server 140. To continue the above example, the candidate information may also include two candidates. A first candidate B0 may have a first candidate identifier (e.g., OxB0010000) and correspond to an internal address and port (e.g., 10.0.2.5:12344). A second candidate B1 may have a second candidate identifier (e.g., OxB0020000) and correspond to an external address and port (e.g., 105.201.2.7:26653). FIG. 8 shows the example candidate information in table form for the CT device 110.

Because the CT device 110 has received the BLOB A from the CO device 105 (including the CO device 105 candidates), the CT device 110 may generate candidate pairs for a P2P connection that may be established between the CO device 105 and the CT device 110. It should be noted that at this point, the CO device 105 does not yet have the candidate information from the CT device 110 and therefore cannot generate the candidate pairs. With its own candidate information and the candidate information from the CO device 105, the CT device 110 may determine that the local candidate B0 is paired with remote candidate A0 while local candidate B1 is paired with remote candidate A1. FIG. 9 shows the example candidate pairs generated by the CT device 110 using the CO device 105 candidates (FIG. 7) received in the BLOB A and the CT device 110 candidates (FIG. 8). Since these candidate pairs are generated by the CT device 110, the B series candidates are local and the A series candidates are remote.

The CT device 110 may transmit the candidate information (FIG. 8) to the CO device 105. Specifically, the CT device 110 may generate a BLOB including the candidates (e.g., B0 and B1) to be transmitted to the CO device 105. Specifically, the BLOB from the CT device 110 (hereinafter "BLOB B") may be transmitted to the P2P application server 120. It should be noted that the steps described above may be performed sequentially, may overlap in time, or may be performed concurrently. Thus, for example, while generating the candidate pairs, the CT device 110 may also transmit its candidate information.

The CT device 110 transmits the candidate information, which is received by the P2P application server 120. Again, no P2P connection is yet established and the P2P application server 120 and the push notification server 125 are still being used. However, according to the example embodiments, the P2P application server 120 may adjust the candidate information of the CT device 110. For example, the P2P application server 120 may zero out the address and port information in each candidate B0 and B1. Accordingly, the P2P application server 120 may generate a first candidate B0' (e.g., 0.0.0.0:0) having the same candidate identifier (e.g., OxB0010000) and a second candidate B1' (e.g., 0.0.0.0:0) having the same candidate identifier (e.g., OxB0020000). The BLOB B may therefore also be adjusted into a BLOB B'. FIG. 10 shows the example adjusted candidate information in table form for the CT device 110 after the address and port information have been adjusted. The BLOB B' may be forwarded to the push notification server 125 with the destination being the CO device 105. Thus, the CO device 105 receives the BLOB B'. When related to the ICE protocol, this may affect the first step of gathering. Although the CO device 105 and the CT device 110 properly gathered its own candidate information, the transmission from the CT device 110 to the CO device 105 is altered.

Since the CO device 105 receives the BLOB B', the CO device 105 may generate the candidate pairs accordingly for a P2P connection that may be established between the CO device 105 and the CT device 110. With its own candidate information and the adjusted candidate information from the CT device 110, the CO device 105 may determine that the local candidate A0 is paired with remote candidate B0' while local candidate A1 is paired with remote candidate B1'. FIG. 11 shows the example candidate pairs generated by CO device 105 based on its candidates (FIG. 7) and the adjusted candidates for the CT device 110 received in BLOB B' (FIG. 10). The CO device 105 may also initiate a timer upon receiving the BLOB B'. The timer will be described in further detail below.

According to the example embodiments, the CT device 110 may be configured to transmit an ICE Binding Request (e.g., part of the offering and answering step of the ICE protocol) to the CO device 105. Those skilled in the art will understand that this may be the opposite of the convention. However, the ICE protocol still supports such a mechanism. The CT device 110 may transmit the ICE Binding Request at a time after transmitting the BLOB B. For example, the CT device 110 may wait a predetermined time after transmitting the BLOB B to transmit the ICE Binding Request. Since the CT device 110 has received an unaltered BLOB A from the CO device 105 (via the P2P application server 120 and the push notification server 125), the CT device 110 may be capable of transmitting the ICE Binding Request to the CO device 105 without the P2P application server 120.

Using the timer that was initiated upon receiving the BLOB B', the example embodiments provide a manner of establishing the P2P connection depending on the type of NAT that the CO device 105 is behind. Specifically, the CO device 105 may perform a first set of operations when the NAT A device 135 is open or full cone while performing a second set of operations when the NAT A device 135 is port restricted or symmetric. When the NAT A device 135 is open or full cone, the CO device 105 is capable of receiving the ICE Binding Request from the CT device 110. Accordingly, the CO device 105 may perform the first set of operations that includes using a derivation application that will be described in greater detail below. When the NAT A device 135 is port restricted or symmetric, the CO device 105 is incapable of receiving the ICE Binding Request from the CT device 110. Accordingly, the CO device 105 may perform the second set of operations that includes using the relay server 130.

According to the first example using the first set of operations (i.e., NAT A device 135 is open or full cone), the CO device 105 may receive the ICE Binding Request. Specifically, the CO device 105 may receive the ICE Binding Request prior to the timer expiring. Thus, the timer may be a predetermined length that provides sufficient time for the ICE Binding Request to be received prior to determining that another mechanism may be required. This process may be part of the checking step of the ICE protocol. The ICE Binding Request from the CT device 110 may include the candidate pairs that it generated (FIG. 9). Specifically, the local candidate B0 was paired with remote candidate A0 while the local candidate B1 was paired with remote candidate A1. When the CO device 105 receives this pairing included in the ICE Binding Request, the CO device 105 performs the checking and determines that there is no matching candidate pair in its list. Specifically, the CO device 105 has the local candidate A0 paired with remote candidate B0' while the local candidate A1 is paired with remote candidate B' as shown in FIG. 11.

Specifically, the CO device 105 will reverse the local and remote candidates received in the ICE Binding Request (FIG. 9) and search its candidate pairs (FIG. 11) for a match. The CO device 105 will determine that the candidate IDs match, but the remote address:port are a mismatch.

The mismatch in the candidate pairs would fail the checking step in the ICE protocol. However, the example embodiments provide the derivation application 240 to address this inconsistency. The derivation application 240 of the CO device 105 may receive the information in the ICE Binding Request from the CT device 110. The derivation application 240 may retrieve the source IP address and port in the ICE Binding Request. In this example, the source IP address and port in the ICE Binding Request is 105.201.2.7: 26653 which is the external address of the CT device 110.

Thus, the candidate B1 may be derived using the source address information. FIG. 12 shows the new derived candidate B1. It should be noted that the remote derived candidate B1 may have a new candidate identifier corresponding thereto. For example, the candidate identifier for the derived candidate B1 may be OxB002A002 (whereas the original candidate B1 had a candidate identifier of OxB0020000). By deriving the actual candidate B1, the CO device 105 may pair its local candidate A1 with the remote derived candidate B1. Thus, a new candidate pair is created as shown in FIG. 13.

With this new candidate pair being created, the CO device 105 transmits an ICE Binding Response to the CT device 110. For example, using the information of the derived candidate B1, the CO device 105 may transmit the ICE Binding Response to the CT device 110 without the P2P application server 120. The ICE Binding Response may be generated by the CO device 105 to include the new candidate pair (FIG. 13) as well as a derivation indication that a derived candidate pair is included therein. For example, the derivation indication may be a flag in the payload that is set. When set, the derivation application 240 of the CT device 110 may determine that the ICE Binding Response should be used to derive a new local candidate. As can be seen from the candidate pair in the ICE Binding Response (FIG. 13), if the CT device 110 were to perform a search on its current candidate pairs (FIG. 9), it would find a match based on IP address and port but the candidate IDs would be incorrect and the setup procedure would fail. However, since the flag is set, the CT device 110 will derive a new local derived candidate B1 prior to performing the search. The new local derived candidate B1 is derived in the same manner as described above for the remote candidate on the CO device 105 side and results in the candidate shown in FIG. 14.

The CT device 110 may also create a new candidate pair using the local derived candidate. Specifically, from the perspective of the CT device 110, the candidate pair list may include a new entry in which the local derived candidate B1 (which has a different candidate identifier than the local candidate B1) is paired with remote candidate A1 as shown in FIG. 15. At this point, the CO device 105 and the CT device 110 both have a candidate pair in its respective list for the candidate A1 having the candidate identifier 0xA0020000 and the derived candidate B1 having the candidate identifier 0xB002A002 (FIGS. 13 and 15).

After the CO device 105 has transmitted the ICE Binding Response to the CT device 110 including the new candidate pair, the CO device 105 may transmit a further ICE Binding Request to the CT device 110. The further ICE Binding Request now includes the new candidate pair. Again, the information of the candidate B1 may be used to transmit the ICE Binding Request to the CT device 110. When the CT device 110 receives the further ICE Binding Request, the CT device 110 determines that it also has the new candidate pair in its list of available candidate pairs. Accordingly, the CT device 110 may transmit a further ICE Binding Response to the CO device 105. In this manner, the checking and completing steps of the ICE protocol may be completed successfully. Thereafter, the P2P connection is established and the video call may be performed over this P2P connection.

It should be noted that the further steps of the ICE protocol may be assumed to be performed. For example, upon generating the candidates, the CO device 105 and the CT device 110 may perform the prioritizing and encoding steps.

According to the second example using the second set of operations (i.e., NAT A device 135 is port restricted or symmetric), the CO device 105 may be incapable of receiving the ICE Binding Request transmitted from the CT device 110 due to the type of NAT that the CO device 105 is behind. Thus, the CO device 105 may not receive any ICE Binding Request prior to the timer lapsing. When the timer has ended and no ICE Binding Request is received from the CT device 110, the CO device 105 may transmit a session setup to the relay server 130. As discussed above, the relay server 130 may provide the intermediary network component that enables a connection to be established between the CO device 105 and the CT device 110 when the P2P connection cannot be readily established for the video call. When the relay server 130 receives the session setup, it may be forwarded to the CT device 110 since the session setup includes the destination information indicating the CT device 110.

After transmitting the session setup, the CO device 105 may transmit a binding request that requests that a relay connection be established between the CO device 105 and the CT device 110 via the relay server 130. The binding request is also forwarded to the CT device 110. The CT device 110 may transmit a binding response to the relay server 130 which is subsequently forwarded to the CO device 105. It should be noted that the relay server 130 may have the source IP address and port for the CO device 105 when receiving the session setup and binding request. Thus, the relay server 130 may forward the binding response to the CO device 105 even when behind a NAT that is port-restricted or symmetric (e.g., the relay server 130 had a packet forwarded directly thereto).

Once the binding response is exchanged, the CO device 105 and the CT device 110 may establish a relay connection. The relay connection may enable the CO device 105 and the CT device 110 to perform the video call. Again, the use of the relay server 130 is designed to be minimized. Thus, to initially allow the video call to be performed, the relay server 130 may be used but a seamless transfer may be performed. Specifically, the checking and completing step of the ICE protocol may be performed such that the P2P connection may be established instead of using the relay connection. Using the information in packets being exchanged during the video call (e.g., source IP and port), the CO device 105 and the CT device 110 may generate a list of candidate pairs used in the checking and completing steps of the ICE protocol. When verified (e.g., SIP ACK transmitted), the CO device 105 and the CT device 110 may perform a teardown for the relay connection as the P2P connection is established.

It should be noted that the use of the timer does not necessitate the use of the relay server in the manner described above. There may be circumstances that the CO device 105 is behind a NAT that is open or full cone but incapable of receiving the ICE Binding Request from the CT device 110 within the life of the timer. Thus, the CO device 105 may still transmit the session setup from the timer expiring. However, prior to the relay connection being established, the CO device 105 may receive the ICE Binding Request. In such a situation, the CO device 105 may terminate the above described steps to establish the relay connection and re-initiate the steps to establish the P2P connection using the derivation application 240. In this manner, the use of the relay server 130 may be further minimized.

Description of Devices in the Network Arrangement 100

FIG. 2 shows an example device 200. In one example, the device 200 may be either the CO device 105 or the CT device 110 that is configured to establish a P2P connection with a further device for the video call. The device 200 may be any electronic component configured to join a network such as a portable device (e.g., a cellular phone, a smartphone, a tablet, a phablet, a laptop, etc.) or a stationary device (e.g., a desktop computer, an IP phone, etc.). In another example, the device 200 may be a server device such as the P2P Application server 120, the push notification server 125, the relay server 130 or the CommNat server 140. The device 200 may include a processor 205, a memory arrangement 210, a display device 215, an input/output (I/O) device 220, a transceiver 225, and other components 230 such as a portable power supply, permanent power supply, an audio I/O device, etc.

The processor 205 may be configured to execute a plurality of applications of the device 200. For example, the applications may include a web browser when connected to the network 115 via the transceiver 225. That is, the web browser may represent a data-related application. In another example, when the device 200 is the CO device 105 or CT device 110 the applications may include a video call application. The video call application may represent any videotelephony program. The video call application may include a functionality for establishing a P2P connection with the further device. In a further example, if the device 200 is the P2P server device 120, an example application may include a videotelephony application that modifies video call setup information that is received from the CT device 110 as will be described in greater detail below.

In another example, the applications for the CO device 105 and the CT device 110 may include a derivation application 240 (shown in dashed lines because such an application will typically be resident on and executed by the CO device 105 and CT device 110, but not the server devices). As will be described in further detail below, the derivation application 240 may operate in conjunction with the video call application in order to establish the P2P connection. It should be noted that the derivation application 240 being an application (e.g., a program) executed by the processor 205 is only example. The application 240 may also be represented as a separate incorporated component of the device 200 or may be a modular component coupled to the device 200. The above examples of applications that may be executed by the processor 205 of the device 200 should indicate that the processor 205 is configured to execute any application that is needed for the device to perform its intended functionalities.

The memory arrangement 210 may be a hardware component configured to store data related to operations performed by the device 200. For example, the memory arrangement 210 may store a caller database associated with the video call application. The caller database may be, for example, a directory of people having associated contact information to be used by the video call application in a video call with a corresponding device of a selected person. The memory arrangement 210 may also store further data such as candidate information that is received for the device 200 as well as candidate information related to the further device. The display device 215 may be a hardware component configured to show data to a user while I/O device 220 may be a hardware component configured to receive inputs from the user and output corresponding data. For example, the display device 215 may provide the video interface for the video stream of the video call. The other components 230 may include a portable power supply (e.g., battery), a fixed power supply (e.g., AC or DC), a data acquisition device, ports to electrically connect the device 200 to other electronic devices, an audio I/O device, etc. Specifically, the audio I/O device such as speaker and a microphone may provide the audio interface for the audio stream of the video call.

When a video call is performed, the CO device 105 may generate an invitation (e.g., ICE Binding Request) to be transmitted to the CT device 110 to establish a P2P connection. However, prior to the invitation being transmitted, the CO device 105 and the CT device 110 may exchange candidate information as discussed above with regard to the ICE protocol. It should be noted that it may be assumed that the CO device 105 and the CT device 110 are both behind a NAT. However, those skilled in the art will understand that if the device is behind an open NAT, this may represent that no NAT exists.

Description of Call Signaling when CO Device is Behind Open or Full Cone NAT

FIG. 3 shows a first example signaling diagram 300 to establish a P2P connection for a video call. Specifically, the signaling diagram 300 relates to the above-described first example of the CO device 105 receiving the ICE Binding Request from the CT device 110 and deriving candidate pairs when the NAT A device 135 is open or full cone.

As described above, the CO device 105 may be behind a NAT A device 135. Thus, to determine the external address mapped to an internal address, the CO device 105 may transmit a request 302 to the CommNAT server 140 for the candidate information such as candidate A0 and A1 (FIG. 7). The CommNAT server transmits a candidate information response 304 to the request 302 including the candidate information. When the CO device 105 receives the candidate information response 304, the BLOB A may be generated which includes the candidate information. With no IP address and port for the CT device 110, the CO device 105 transmits a BLOB A transmission 306 to the P2P application server 120 which forwards 308 the BLOB A to the push notification server 125. The BLOB A is then further transmitted 310 to the CT device 110.

When the CT device 110 receives the BLOB A, the CT device 110 may also perform substantially similar process of sending a request 312 to the CommNAT Server 140 and receiving a candidate information response 314 including the candidate information for CT device 110 such as candidate B0 and B1 (FIG. 8). The CT device 110 may also generate a list of candidate pairs from the candidate information included in the BLOB A and its own candidate information (FIG. 9). For example, local candidate B0 is paired with remote candidate A0 and local candidate B1 is paired with remote candidate A1. Subsequently, the CT device 110 may generate the BLOB B including its candidate information and transmit 316 the BLOB B to the P2P application server 120.

As discussed above, when the P2P application server 120 receives the BLOB B from the CT device 110, the candidate information of the CT device 110 may be adjusted 318 such as zeroing out the IP address and corresponding port to generate candidates B0' and B1' (FIG. 10). The BLOB B' including the candidates B0' and B1' may be forwarded 320 to the push notification server 125, which transmits 320 the BLOB B' to the CO device 105.

Upon receiving the BLOB B', the CO device 105 may start a timer 324 and also generate a list of candidate pairs from the candidate information included in the BLOB B' and its own candidate information (FIG. 11). For example, local candidate A0 is paired with remote candidate B0' and local candidate A1 is paired with remote candidate B1'. The CO device 105 may subsequently receive the ICE Binding Request 326 from the CT device 110. For the purposes of this signaling diagram 300, it is assumed that the ICE Binding Request 326 is received prior to the expiration of the timer 324. The situation of the CO device 105 not receiving the ICE Binding Request 326 prior to the expiration of the timer 324 is discussed in more detail with reference to the signaling diagram 400 of FIG. 4.

The ICE Binding Request 326 may have the candidate pairs that the CT device 110 has generated in its list (FIG. 9). However, the CO device 105 determines that there is no corresponding pair in its list of candidate pairs since each candidate B was replaced by the P2P application server 120 by a candidate B'. The derivation application 240 of the CO device 105 may extract the IP address and port associated with remote candidate B1 from the source information of the ICE Binding Request 326. Thus, the derivation application 240 may derive 328 a new remote derived candidate B1 (FIG. 12) and a new candidate pair using the remote derived candidate B1 that is paired to the candidate A1 (FIG. 13).

The CO device 105 may generate the ICE Binding Response 330 that includes this new candidate pair and transmit it to the CT device 110. The ICE Binding Response 330 may be generated to include a flag that indicates to the derivation application 240 of the CT device 110 that a new local candidate should be derived. The CT device 110 derives 332 a new local candidate (FIG. 14) and a new candidate pair (FIG. 15) with the local derived candidate B1 and the remote candidate A1.

The CO device 105 may then generate a further ICE Binding Request 334 that includes the new candidate pair (FIG. 15). When the CT device 110 receives this further ICE Binding Request 334, the new candidate pair is also in its list of available candidate pairs. The ICE Binding Response 336 transmitted from the CT device 110 verifies that there is a match in both lists for a candidate pair to be used. Thus, the P2P 338 connection may be established and the video call may be performed.

Description of Call Signaling when CO Device is Behind Port Restricted or Symmetric NAT FIG. 4 shows a second example signaling diagram 400 to establish a P2P connection for a video call. Specifically, the signaling diagram 400 relates to the above-described second example of the CO device 105 failing to receive the ICE Binding Request from the CT device 110 and transmitting a session setup to a relay server when the NAT A device 135 that the CO device 105 is behind is port restricted or symmetric.

As discussed above, this process may include substantially similar steps described above in the first signaling diagram 300. Specifically, the processes 402-424 correspond to and are identical to the processes 302-324 described above with reference to signaling diagram 300 and are therefore not described a second time. However, when the ICE Binding Request 426 is transmitted from the CT device 110, the CO device 105 is incapable of receiving it due to the NAT A device 135 being port restricted or symmetric. When the timer 424 has expired without the CO device 105 receiving the ICE Binding Request 426, the CO device 105 generates and transmits a session setup 428 to the relay server 130. The relay server 130 forwards 430 the session setup to the CT device 110.

The CO device 105 also generates and transmits a binding request 432 to the relay server 130 which forwards 434 the binding request to the CT device 110. The CT device generates and transmits a binding response 436 to the relay server 130, which is forwarded 438 to the CO device 105. Subsequently, the relay connection 440 may be established between the CO device 105 and the CT device 110 for the video call to be performed.

At a subsequent time, the CO device 105 and the CT device 110 may perform the ICE checking 442 and completing steps using IP address and port information included in the packets being exchanged during the video call through the relay server 130. Thus, the P2P connection 444 may be established and used for a remainder of the voice call while a teardown is performed for the relay connection.

FIG. 5 shows a first example method 500 for establishing a P2P connection for a video call by the CO device 105. That is, the method 500 relates to a manner in which the CO device 105 handles inviting the CT device 110 to a video call. The method 500 incorporates features from both the first and second examples discussed above which relates to the CO device 105 being behind a NAT that is open, full cone, port restricted, or symmetric. The method 500 will be described with regard to the network arrangement 100 of FIG. 1 and the device 200 of FIG. 2.

In step 502, the CO device 105 transmits a request to the CommNAT server 140 for its candidate information such as candidate A0 (having candidate ID Y0) and A1 (having candidate ID Y1). In step 504, the candidate information is received. In step 506, the CO device 105 generates and transmits BLOB A including the candidate information to the CT device 110 via the P2P application server 120 and the push notification server 125.

In step 508, the CO device 105 receives the BLOB B'. As discussed above, the BLOB B including candidate information of the CT device 110 such as candidate B0 and B1 may be transmitted to the P2P application server 120. The P2P application server 120 may adjust the BLOB B to generate the BLOB B' in which the candidate information becomes candidate B0' and B1' but retaining the respective candidate identifier. It should be noted that the CO device 105 may generate the list of available candidates using the candidates from the BLOB B' and its own candidates. Upon receiving the BLOB B', in step 510, the CO device 105 initiates the timer.

In step 512, the CO device 105 determines whether the ICE Binding Request is incoming within the life of the timer. If the ICE Binding Request is inbound, the method 500 continues to step 514 in which the ICE Binding Request is received. In step 516, the derivation application 240 of the CO device 105 derives a new candidate pair. Specifically, the source information from the ICE Binding Request is used to derive the IP address and port corresponding to the candidate B1. This derived candidate B1 is defined with a new candidate ID. Accordingly, the new candidate pair includes the local candidate A1 and remote derived candidate B1.

In step 518, the CO device 105 generates the ICE Binding Response including the new candidate pair. In step 520, using the source information from the ICE Binding Request, the CO device 105 transmits the ICE Binding Response to the CT device 110. In step 522, the CO device 105 generates and transmits a further ICE Binding Request including the new candidate pair to the CT device 110 again using the source information from the ICE Binding Request. In step 524, the CO device 105 receives the ICE Binding Response from the CT device 110 which indicates that there is a candidate pair match from both lists. Thus, in step 526, a P2P connection is established and the video call is performed over the P2P connection.

Returning to step 512, if the ICE Binding Request is not received, the method 500 continues to step 528. In step 528, the CO device 105 determines if the timer has expired. If the timer is still running, the method 500 returns to step 512. If the timer has expired, the method 500 continues to step 530.

In step 530, the CO device 105 generates and transmits a session setup to the relay server 130. The session setup may include the destination identity of the CT device 110. Thus, the relay server 130 may forward the session setup to the CT device 110. In step 532, the CO device 105 may transmit a binding request to the relay server which is then forwarded to the CT device 110. In step 534, the CO device 105 may receive a binding response from the CT device 110 via the relay server 130. Thus, a relay connection may be established. Therefore, in step 536, the video call is performed over the relay connection.

In step 538, the CO device 105 performs the ICE checking and completing steps. For example, the IP address and port information from packets used in the video call may be used to determine candidate pairs for the checking step. In step 540, the CO device 105 performs the completing step to determine if the candidate pair is verified with the CT device 110. If not verified, the method 500 returns to step 536. However, if verified, the method 500 continues to step 542. In step 542, a teardown is performed for the relay connection such that a P2P connection is established. Thus, the method 500 continues to step 526 to perform the video call over the P2P connection.

FIG. 6 shows a second example method 600 for establishing a P2P connection for a video call by the CT device 110. That is, the method 600 relates to a manner in which the CT device 110 handles being invited by the CO device 105 to a video call. The method 600 incorporates features from both the first and second examples discussed above which relates to the CO device 105 being behind a NAT that is open, full cone, port restricted, or symmetric. The method 600 will be described with regard to the network arrangement 100 of FIG. 1 and the device 200 of FIG. 2.

In step 602, the CT device 110 receives the BLOB A from the CO device 105 via the P2P application server 120 and the push notification server 125. In step 604, the CT device 110 which is behind NAT B transmits a request to the CommNAT server for its candidate information including candidate B0 (having candidate ID Z0) and B1 (having candidate ID Z1). In step 606, the CT device 110 receives the candidate information. In step 608, the CT device 110 generates the BLOB B including the candidate information for transmission to the CO device 105. Although the CT device 110 transmits the BLOB B with the intention that this exact BLOB is to be received by the CO device 105, the P2P application server 120 may adjust the candidate information in the BLOB B to generate the BLOB B'. It should be noted that the CT device 110 may generate the list of available candidate pairs upon receiving the BLOB A and its own candidate information. In step 610, the CT device 110 transmits the ICE Binding Request including the list of available candidate pairs as determined by the CT device 110.

In step 612, the CT device 110 determines whether the ICE Binding Response is received. As discussed above, if the CO device 105 is behind a NAT that is open or full cone, the CO device 105 may receive the ICE Binding Request to subsequently transmit the ICE Binding Response. Thus, if the ICE Binding Response is received, the method 600 continues to step 614.

In step 614, the CT device 110 receives the binding response from the CO device 105. In step 616, the derivation application 240 of the CT device 110 detects that the flag is set in the ICE Binding Request such that the candidate pairs are to be adjusted by including the new candidate pair that is present in the ICE Binding Response.

In step 618, the CT device 110 receives the further ICE Binding Request from the CO device 105 which includes the list of candidate pairs as determined by the CO device 105 but also includes the new candidate pair (which was derived by the CO device 105). In step 620, the CT device 110 transmits the further ICE Binding Response to the CO device 105 indicating that there is a match in the available candidate pairs from both lists. Thus, in step 622, the P2P connection is established and the video call is performed over the P2P connection.

Returning to step 612, if the CT device 110 determines that a different form of response is received, the method 600 continues to step 624. As discussed above, if the CO device 105 is behind a NAT that is port restricted or symmetric, the CO device 105 may not receive the ICE Binding Request, thereby transmitting a session setup. In step 624, the CT device 110 receives the session setup from the CO device 105 via the relay server 130. In step 626, the CT device 110 receives the binding request from the CO device 105 via the relay server 130. In step 628, the CT device 110 generates and transmits the binding response to the CO device 105 via the relay server 130. In this manner, a relay connection may be established using the relay server 130. Thus, in step 630, the video call is performed over the relay connection.

In step 632, the CT device 110 performs the ICE checking and completing steps. Again, the IP address and port information from packets used in the video call may be used to determine candidate pairs for the checking step. In step 634, the CT device 110 performs the completing step to determine if the candidate pair is verified with the CO device 105. If not verified, the method 600 returns to step 630. However, if verified, the method 600 continues to step 636. In step 636, a teardown is performed for the relay connection such that a P2P connection is established. Thus, the method 600 continues to step 622 to perform the video call over the P2P connection.

The example embodiments provide a system and method for establishing a P2P connection between a CO device and a CT device such that a video call may be performed. Specifically, the P2P connection may be established using an adjusted ICE protocol procedure. When candidate information is generated by the CO device and provided to the CT device, the CT device may also generate and provide candidate information to the CO device. During this stage, a P2P application server is used for the candidate information to be exchanged. The P2P application server may forward the candidate information of the CO device without adjustments to the CT device. However, the P2P application server may adjust the candidate information of the CT device prior to forwarding to the CO device. In this manner, the typical ICE protocol procedure is deviated. More generally, this relates to a situation where the CO device and the CT device have respective lists of candidate pairs in which no candidate pair matches between the lists such that a P2P connection fails to establish.

According to a first example, a derivation application may provide one mechanism for the P2P connection to be established when the CO device is behind a NAT that is open or full cone. Specifically, an ICE Binding Request received by the CO device from the CT device may include source information that is used to generate a derived candidate of the CT device. Thus, a new candidate pair may be generated. The CO device may transmit an ICE Binding Response to the CT device including this new candidate pair. The CT device may include this new candidate pair in its list of available candidate pairs. The CO device may subsequently transmit a further ICE Binding Request including the new candidate pair. As the CT device also has the new candidate pair, the CT device may transmit a further ICE Binding Response indicating the match. Thus, a P2P connection may be established.

According to a second example, a relay server may be utilized for a relay connection to first be established such that a P2P connection may subsequently be established when the CO device is behind a NAT that is port restricted or symmetric. Specifically, the failure to receive the ICE Binding Request from the CT device prompts the CO device to create a relay connection with the CT device using the relay server. After the relay connection is established, ICE checking and completing steps may be performed to teardown the relay connection as a P2P connection is established.

Those skilled in the art will understand that the above-described example embodiments may be implemented in any suitable software or hardware configuration or combination thereof. An example hardware platform for implementing the example embodiments may include, for example, an Intel x86 based platform with compatible operating system, a Mac platform and MAC OS, etc. In a further example, the example embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, performed in a system that includes
   an originating device,
   a terminating device,
   a first network address translation (NAT) device that performs NAT for the originating device,
   a second NAT device that performs NAT for the terminating device,
   a videotelephony server, and
   a push notification server,
   the method comprising:

sending, by the originating device via the first NAT device, a first message to the videotelephony server that includes first candidate information relating to the originating device, wherein the first candidate information has a unique identifier and includes at least an Internet Protocol (IP) address and a port number;

sending to the terminating device, routed through at least the videotelephony server and the push notification server via the second NAT device, the first message including the first candidate information;

generating, by the terminating device, a first list of candidate pairs based on at least the first candidate information in the first message and second candidate information relating to the terminating device, wherein the second candidate information has a unique identifier and includes at least an IP address and a port number;

sending, by the terminating device via the second NAT device, a second message to the videotelephony server including the second candidate information;

adjusting, by the videotelephony server, the unique identifier of the second candidate information to create an adjusted second candidate information;

sending to the originating device, routed through at least the videotelephony server and the push notification server via the first NAT device, a message including the adjusted second candidate information;

sending, by the terminating device, at least a binding request to the originating device, the binding request including the first list of candidate pairs;

generating, by the originating device, a second list of candidate pairs based on the first candidate information and the adjusted second candidate information; and determining, by the originating device, if the binding request is received within a predetermined amount of time after a last message sent to the originating device.

2. The method of claim 1, wherein, when the binding request is received within the predetermined amount of time, the method further comprises:

determining, by the originating device, if any of the candidate pairs from the first list match any of the candidate pairs from the second list, by comparing the unique candidate identifier of each candidate of the candidate pairs in the first list and the second list; and comparing at least the respective IP address and port numbers of each candidate of the candidate pairs in the first list and the second list;

when there is no match between the candidate pairs from the first list and the second list, deriving, by the originating device, a first new candidate related to the terminating device based on at least a source address and port number included in the binding request;

generating, by the originating device, a first new candidate pair based on the first new candidate and the first candidate information;

generating, by the originating device, a binding response including the first new candidate pair and a derivation indication, wherein the derivation indication indicates to the terminating device that a second new candidate is to be derived;

sending, by the originating device, the binding response to the terminating device;

determining, by the terminating device, that the binding response includes the derivation indication;

deriving, by the terminating device, a second new candidate related to the terminating device based on at least a destination address and port number of the first new candidate of the first new candidate pair included in the binding response;

generating, by the terminating device, a second new candidate pair based on the second new candidate and the first candidate information;

sending, by the originating device, a second binding request to the terminating device including the first new candidate pair;

comparing, by the terminating device, the second new candidate pair to the first new candidate pair;

when the second new candidate pair matches the new candidate pair, sending, by the terminating device, a second binding response including the second new candidate pair and the new candidate pair; and establishing a peer-to-peer (P2P) connection between the originating device and the terminating device.

3. The method of claim 2, wherein the first NAT device implements a full cone NAT protocol.

4. The method of claim 2, wherein each candidate pair includes a local candidate and a remote candidate with respect to the terminating device and the originating device, and wherein the new candidate is a remote candidate with respect to the originating device and the second new candidate is a local candidate with respect to the terminating device.

5. The method of claim 2, wherein a relay server provides a further intermediary component that enables a provisional communication pathway following an initial P2P connection between the originating device and the terminating device.

6. The method of claim 2, wherein the IP address and corresponding port for the new candidate is identical to at least one candidate in the second candidate information without having an identical unique identifier.

7. The method of claim 2, wherein the derivation indication is a flag that is set in a payload of the binding response.

8. The method of claim 1, wherein, when the binding request is not received within the predetermined amount of time, the method further comprises:

generating and sending, by the originating device, a session setup message to a relay server;

sending, by the relay server, the session setup message to the terminating device;

establishing a relay connection between the originating device and the terminating device based on the session setup message;

sending, by the originating device, a second binding request to the relay server including the first candidate information related to the originating device;

sending, by the relay server, the second binding request to the terminating device;

sending, by the terminating device, a second binding response to the relay server including second candidate information related to the terminating device;

sending, by the relay server, the second binding response to the originating device;

establishing a videotelephony call between the originating device and the terminating device via a connection through the relay server;

establishing a peer-to-peer (P2P) connection between the originating device and the terminating device based on the first and second candidate information;

terminating the connection through the relay server; and continuing the videotelephony call via the P2P connection.

9. The method of claim 8, wherein the first NAT device implements a port restricted NAT protocol or implements a symmetric NAT protocol.

10. The method of claim 8, wherein the relay server has at least a source IP address and port for the originating device when receiving the session setup message and the second binding request.

11. The method of claim 1, wherein the first candidate information includes a first candidate based on an IP address and port for the originating device that is internal to the first NAT device and a second candidate based on an IP address and port for the originating device that are external to the first NAT device, wherein the second candidate information includes a third candidate based on at least an IP address and port for the terminating device that is internal to the second NAT device and a fourth candidate based on at least an IP address and port for the terminating device that are external to the second NAT device.

12. The method of claim 1, wherein the first candidate information is included in the first message as a binary large object.

13. The method of claim 1, wherein the binding request is an Interactive Connectivity Establishment (ICE) binding request.

14. A method, comprising:
at an originating device:
receiving, from a network address translation (NAT) device associated with the originating device, first candidate information related to the originating device, wherein each candidate of the first candidate information has a unique identifier and includes at least a respective Internet Protocol (IP) address and corresponding port number;
sending a message including the first candidate information, wherein the message is bound for a terminating device with which the originating device is attempting to establish a peer-to-peer (P2P) connection, wherein the message is routed through at least a videotelephony server and a push notification server;
receiving second candidate information related to the terminating device, wherein each candidate of the second candidate information includes altered IP address and corresponding altered port number and retained respective candidate unique identifier, wherein the altered IP address and altered port number is different from an actual IP address and port number for each candidate;
generating a first list of candidate pairs based on the first candidate information and the second candidate information;
receiving a binding request including a second list of candidate pairs from the terminating device within a predetermined period of time from receiving the second candidate information;
determining if any of the candidate pairs from the first list match any of the candidate pairs from the second list;
when there is no match between the candidate pairs from the first list and the second list, deriving a new candidate related to the terminating device based on at least a source address and port number included in the binding request;
generating a new candidate pair based on the new candidate and the first candidate information;
generating a binding response including the new candidate pair and a derivation indication, wherein the derivation indication indicates to the terminating device that a second new candidate is to be derived;
sending the binding response to the terminating device;
sending a second binding request to the terminating device including the new candidate pair;
receiving a second binding response from the terminating device including the new candidate pair;
determining, by the originating device, if a binding request is received within a predetermined amount of time; and
establishing the peer-to-peer (P2P) connection with the terminating device.

15. The method of claim 14, wherein the new candidate pair includes a local candidate and a remote candidate with respect to the originating device.

16. The method of claim 14, wherein the second binding request is sent with the new candidate pair and a source information from the first binding request, and wherein the originating device receives the second binding response which indicates there is a candidate pair match from each of the first and second lists.

17. The method of claim 14, further comprising:
at the originating device, when the binding request is not received within the predetermined period of time, the method further comprises:
generating and sending a session setup message to a relay server to establish a relay connection with the terminating device;
sending a relay binding request to the terminating device via the relay server, the relay binding request including the first candidate information related to the originating device;
receiving, from the terminating device via the relay server, a relay binding response including second candidate information related to the terminating device;
establishing a videotelephony call with the terminating device via a connection through the relay server;
establishing the P2P connection with the terminating device based on the first and second candidate information;
terminating the connection through the relay server; and
continuing the videotelephony call with the terminating device via the P2P connection.

18. The method of claim 15, wherein the connection terminating is performed if the originating device verifies the candidate pair with the terminating device via an Interactive Connectivity Establishment Protocol (ICE).

19. A method, comprising:
at a terminating device:
receiving, from a network address translation (NAT) device associated with the terminating device, first candidate information related to the terminating device,
receiving second candidate information related to an originating device that is attempting to establish a peer-to-peer (P2P) connection with the terminating device, wherein each candidate of the first and second candidate information has a unique identifier and includes at least a respective Internet Protocol (IP) address and corresponding port number;
sending a message including the first candidate information, wherein the message is bound for the originating device, the message is routed through a videotelephony server that alters the unique identifier in the second candidate information;

generating a first list of candidate pairs based on the first candidate information and the second candidate information;

sending a binding request including the first list of candidate pairs to the originating device;

receiving a binding response from the originating device, the binding response including a second list of candidate pairs and a derivation indication, wherein one of the candidate pairs of the second list includes a new candidate derived by the originating device, wherein the derivation indication indicates to the terminating device that a second new candidate is to be derived by the terminating device;

deriving the second new candidate related to the terminating device based on at least an IP address and port number of the new candidate of the one of the candidate pairs of the second list;

generating a new candidate pair based on the second new candidate and the second candidate information;

receiving a second binding request from the originating device including the new candidate pair;

sending to the originating device a second binding response including the new candidate pair;

determining, by the originating device, if a binding request is received within a predetermined amount of time; and establishing the peer-to-peer (P2P) connection with the originating device.

20. The method of claim 19, further comprising:

at the terminating device, when the binding request is not received within the predetermined period of time, the method further comprises:

receiving a session setup message from a relay server to establish a relay connection with the originating device;

receiving a relay binding request from the originating device via the relay server, the relay binding request including the first candidate information related to the terminating device;

receiving, from the originating device via the relay server, a relay binding response including second candidate information related to the originating device;

establishing a videotelephony call with the originating device via a connection through the relay server;

establishing the P2P connection with the originating device based on the first and second candidate information;

terminating the connection through the relay server; and continuing the videotelephony call with the originating device via the P2P connection.

* * * * *